(12) United States Patent
Suh et al.

(10) Patent No.: US 9,659,419 B2
(45) Date of Patent: May 23, 2017

(54) METHOD OF CONTROLLING MOBILE TERMINAL BASED ON LOCATION INFORMATION AND APPLYING SECURITY POLICY BASED ON PRIORITY RULES, AND SYSTEM THEREOF

(71) Applicant: LG CNS CO., LTD., Seoul (KR)

(72) Inventors: Gwang Sik Suh, Seoul (KR); Dong Go Jang, Seoul (KR); Ja Yoon Kong, Seoul (KR); Yong Seock Pai, Seoul (KR); Sun Hwa Shim, Seoul (KR); Byung Chul Lim, Seoul (KR); Cho Rhong Chang, Seoul (KR); Sung Min Hong, Seoul (KR)

(73) Assignee: LG CNS CO., LTD., Seoul (KR)

( * ) Notice: Subject to any disclaimer, the term of this patent is extended or adjusted under 35 U.S.C. 154(b) by 76 days.

(21) Appl. No.: 14/455,563

(22) Filed: Aug. 8, 2014

(65) Prior Publication Data
US 2015/0042449 A1 Feb. 12, 2015

(30) Foreign Application Priority Data

Aug. 9, 2013 (KR) ........................ 10-2013-0095005

(51) Int. Cl.
*B60R 25/00* (2013.01)
*G07C 9/00* (2006.01)
(Continued)

(52) U.S. Cl.
CPC ...... *G07C 9/00111* (2013.01); *G07C 9/00007* (2013.01); *H04W 4/04* (2013.01); *H04W 12/08* (2013.01); *G07C 2209/04* (2013.01)

(58) Field of Classification Search
CPC combination set(s) only.
See application file for complete search history.

(56) References Cited

U.S. PATENT DOCUMENTS

2011/0195699 A1* 8/2011 Tadayon ............. H04B 5/0062
455/418
2012/0284779 A1* 11/2012 Ingrassia, Jr. ........... G06F 21/70
726/5

FOREIGN PATENT DOCUMENTS

| KR | 10-2009-0059293 | 6/2009 |
| KR | 10-2012-0108266 | 10/2012 |
| KR | 10-2013-0073708 | 7/2013 |

OTHER PUBLICATIONS

Korean Intellectual Property Office Application Serial No. 10-2013-0095005, Office Action dated Jul. 24, 2014, 6 pages.

* cited by examiner

*Primary Examiner* — Brian Zimmerman
*Assistant Examiner* — Thomas McCormack
(74) *Attorney, Agent, or Firm* — Lee Hong Degerman Kang & Waimey

(57) ABSTRACT

A method for controlling a mobile terminal that includes receiving, at the mobile terminal, a security level of a defined location. The security level is set based on at least one of gate access information indicating a user of the mobile terminal is entering or exiting a gate, global positioning system (GPS) information of the mobile terminal, or an identifier (ID) of a wireless network apparatus scanned by the mobile terminal. The method further includes obtaining location information of the mobile terminal from a source that is determined according to the security level, identifying location of the mobile terminal based on the obtained location information, and applying a security policy to the mobile terminal based on the security level when the identified location corresponds to the defined location.

16 Claims, 12 Drawing Sheets

(51) Int. Cl.
*H04W 4/04* (2009.01)
*H04W 12/08* (2009.01)

METHOD OF CONTROLLING MOBILE TERMINAL BASED ON LOCATION INFORMATION AND APPLYING SECURITY POLICY BASED ON PRIORITY RULES, AND SYSTEM THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0095005, filed on Aug. 9, 2013, the contents of which are hereby incorporated by reference herein in their entirety.

BACKGROUND

1. Field of the Invention

The present invention relates to a method of applying a mobile terminal security policy based on a rule for determining a location of a mobile terminal and controlling the mobile terminal and a system to which the method is applied.

2. Description of the Related Art

In a location-based mobile terminal control system interworking with an access control system, when an access by a permitted party is detected, the access control system transmits detected information to an access record control server. The access record control server transmits the received information to a location-based mobile terminal control system server to inform the location-based mobile terminal control system server of the party gaining the access, and a location and a time at which the access is gained. When the location-based mobile terminal control system receives an access event, the location-based mobile terminal control system re-transmits the received information to a mobile terminal.

In the location-based mobile terminal control system using a wireless communication apparatus, when the mobile terminal moves into a predefined control area, a wireless network apparatus installed in the control area is searched for by the mobile terminal, and a mobile terminal control system client recognizes an identifier (ID) of the wireless network apparatus. The mobile terminal control system client searches for a control policy corresponding to the ID of the wireless network apparatus and applies the control policy found through the mobile terminal conducting a search.

SUMMARY

According to an aspect of the present invention, there is provided a method of controlling a mobile terminal including receiving a security level of a predetermined location, obtaining location information about the mobile terminal based on the security level, and applying a predetermined security policy based on the security level when the mobile terminal is determined to be present at the predetermined location based on the location information. The security level may be set based on at least one of gate access information indicating a user of the mobile terminal entering or exiting a gate, global positioning system (GPS) information about the mobile terminal, or an identifier (ID) of a wireless network apparatus scanned in the mobile terminal.

The security level may include any one of high security, entry preferred, exit preferred, or low security, that can be set based on the obtained location information.

High security may be applied when the location information obtained through any one of the gate access information, the GPS information, or the ID corresponds to the predetermined location. When the gate access information indicates an exit, the entry preferred security level may be applied when the location information obtained through the GPS information and the ID corresponds to the predetermined location. When the gate access information indicates an entry, the exit preferred security level may be applied when the location information obtained through any one of the GPS information and the ID corresponds to the predetermined location. A low security level may be applied when the location information obtained through the gate access information, the GPS information, and the ID corresponds to the predetermined location.

A method of controlling the mobile terminal may further include receiving an ID list of wireless network apparatuses installed at the predetermined location from a security control server. The obtaining of the location information about the mobile terminal may include comparing the ID of the wireless network apparatus scanned in the mobile terminal to the ID list.

The gate access information may be obtained from the security control server when the user of the mobile terminal enters or exits the gate.

The method of controlling the mobile terminal may be performed through a security application installed in the mobile terminal.

According to another aspect of the present invention, there is provided an operating method of a security control server, the method including transmitting a security level of a predetermined location to a mobile terminal and transmitting, to the mobile terminal, location information about the mobile terminal based on the security level. The security level may be set using one of gate access information indicating a user of the mobile terminal entering or exiting a gate, GPS information about the mobile terminal, or an ID of a wireless network apparatus scanned in the mobile terminal.

The operating method may further include determining whether update information for the security level is present by interworking with a security application installed in the mobile terminal, and transmitting the update information to the mobile terminal.

The transmitting of the location information may include transmitting, to the mobile terminal, the gate access information indicating the user of the mobile terminal entering or exiting the gate.

The security level may include any one of high security, entry preferred, exit preferred, or low security, and at least one function of the mobile terminal may be restricted based on a predetermined security policy corresponding to the security level.

High security may be applied when the location information obtained through any one of the gate access information, the GPS information, or the ID corresponds to the predetermined location. When the gate access information indicates an exit, the entry preferred may be applied when the location information obtained through the GPS information and the ID corresponds to the predetermined location. When the gate access information indicates an entry, the exit preferred security level may be applied when the location information obtained through any one of the GPS information and the ID corresponds to the predetermined location. A low security level may be applied when the location information obtained through the gate access information, the GPS information, and the ID corresponds to the predetermined location.

The operating method may further include transmitting, to the mobile terminal, an ID list of wireless network apparatuses installed at the predetermined location.

According to still another aspect of the present invention, there is provided a security control server including a location transmitter to transmit gate access information to a mobile terminal of a user when the user passes through a gate at a predetermined location, a security level transmitter to transmit a security level of the predetermined location to the mobile terminal, and a control command transmitter to verify whether update information for the security level is present by interworking with a security application installed in the mobile terminal and transmit the update information to the mobile terminal. The security level may be set using one of the gate access information, GPS information about the mobile terminal, or an ID of a wireless network apparatus scanned in the mobile terminal.

The security level may include any one of high security, entry preferred, exit preferred, or low security, and at least one function of the mobile terminal may be restricted based on a predetermined security policy corresponding to the security level.

High security may be applied when the location information obtained through any one of the gate access information, the GPS information, or the ID corresponds to the predetermined location. When the gate access information indicates an exit, the entry preferred security level may be applied when the location information obtained through the GPS information and the ID corresponds to the predetermined location. When the gate access information indicates an entry, the exit preferred security level may be applied when the location information obtained through any one of the GPS information or the ID corresponds to the predetermined location. A low security level may be applied when the location information obtained through the gate access information, the GPS information, and the ID corresponds to the predetermined location.

The control command transmitter may transmit, to the mobile terminal, an ID list of wireless network apparatuses installed at the predetermined location.

The gate access information may be transmitted to the mobile terminal through pushing.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
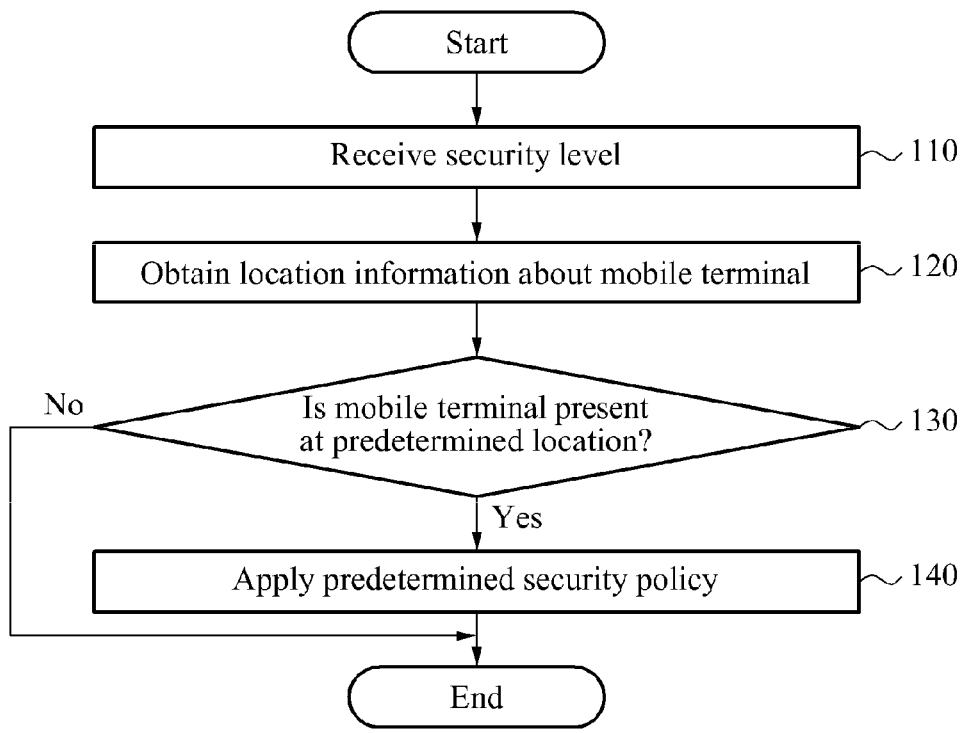
FIG. 1 is a flowchart illustrating a method of controlling a mobile terminal according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

Description related to known functions or configurations has, in some cases, been omitted for clarity. Also, terms used herein are defined to appropriately describe the exemplary embodiments of the present invention and thus may be changed depending on a user, the intent of an operator, or custom. Accordingly, the terms must be defined based on the following overall description of this specification.

A mobile terminal described herein may refer to a mobile device such as a personal digital assistant (PDA), a smartphone, a mobile phone, a tablet personal computer (PC), and a pad type computer that is carried by a user and equipped with a communication function.

<A Method of Controlling a Mobile Terminal>

FIG. 1 is a flowchart illustrating a method of controlling a mobile terminal according to an embodiment of the present invention.

Referring to FIG. 1, in operation 110, the mobile terminal receives a security level of a predetermined or defined location from a security control server. The mobile terminal may receive the security level from the security control server through a security application, for example, of a mobile terminal control system client installed in the mobile terminal. The security level may be newly received from the security control server every time the location information about the mobile terminal is determined to correspond to the predetermined location. Alternatively, the security level may be information received from the security control server in advance and stored in the mobile terminal. When the security level is updated, the security control server may transmit a new security level to the mobile terminal and allow the security level stored in the mobile terminal to be updated. The security level may further include version information or information about a date at which most recent update is achieved, and thus, a most recently updated security level may be reflected and implemented.

The security level may be set based on one or more of gate access information indicating a user of the mobile terminal entering or exiting a gate, global positioning system (GPS) information about the mobile terminal, and an identifier (ID) of a wireless network apparatus scanned in the mobile terminal.

The security level may have a defined level, such as "high security," "entry preferred," "exit preferred," or "low security."

High security may refer to a security level to which a predetermined security policy is applied when a location of the mobile terminal obtained based on any one of the gate access information, the GPS information, or the ID corresponds to a predetermined location. When the security level is high security, the security policy may be immediately applied when the mobile terminal receives the gate access information indicating an "entry" from the security control server. In this scenario, the mobile terminal does not need to obtain the GPS information or the ID. When the security policy is applied while the security level is high security, at least one function of the mobile terminal may be restricted in accordance with the security policy.

The entry preferred security level may refer to a security level to which a predetermined security policy is applied when the gate access information transmitted from the security control server to the mobile terminal indicates an "exit," and a location of the mobile terminal obtained based on the GPS information about the mobile terminal and the wireless network ID scanned in the mobile terminal corresponds to the predetermined location. The security policy may be immediately applied when the mobile terminal receives the gate access information indicating an "entry" from the security control server. In this scenario, the mobile terminal does not need to obtain the GPS information about the mobile terminal or the wireless network ID. When the security policy is applied while the security level is entry preferred, at least one function of the mobile terminal may be restricted in accordance with the security policy.

The exit preferred security level may refer to a security level to which a security policy is applied when the gate access information indicates an "entry" and a location of the mobile terminal obtained based on any one of the GPS information about the mobile terminal and the wireless network ID corresponds to the predetermined location. This security policy may be immediately cancelled when the mobile terminal receives the gate access information indicating an "exit" from the security control server. When the security policy is applied at the security level of the exit preferred, at least one function of the mobile terminal may be restricted in accordance with the security policy.

Low security may refer to a security level to which a security policy is applied when a location of the mobile terminal obtained based on the gate access information, the GPS information, and the ID corresponds to the predetermined location. The low security level may be set in an area that may not require a relatively high level of security. The foregoing security levels will be described in more detail with later reference to FIGS. 3 through 6.

Referring still to FIG. 1, in operation 120, the location information about the mobile terminal is obtained based on the security level. Here, location determining logics used to obtain the location information about the mobile terminal include the gate access information indicating the user of the mobile terminal is entering or exiting the gate, the GPS information about the mobile terminal, and the ID, for example, a service set ID (SSID), of the wireless network apparatus scanned by the mobile terminal.

The gate access information may be obtained from the security control server when the user of the mobile terminal enters or exits the gate. The method of controlling the mobile terminal may be performed through a security application installed in the mobile terminal.

The gate access information may be obtained through interworking between an access control system of a workplace and a mobile terminal control system. The security control server may include the access control system and the mobile terminal control system. More particularly, the access control system may detect whether the user of the mobile terminal enters or exits the gate. The user may pass through the access control system by allowing a radio-frequency identification (RFID) card and the like to approach the access control system in a non-contact manner. In this scenario, the access control system may transmit the gate access information to the mobile terminal of the user identified by the RFID card through the mobile terminal control system. Thus, the access control system may identify a party entering the gate, trace a location and time at which the party enters, and form and manage a database (DB) on details obtained by the tracing.

The gate access information may be transmitted to the mobile terminal through pushing. When the gate access information is transmitted to the mobile terminal, the security application, for example, of a mobile terminal control system client installed in the mobile terminal may determine whether the user of the mobile terminal enters or exits the workplace. Here, the access control system may manage a state of access to an area. The security application, or the mobile terminal control system client, may be installed in the mobile terminal of the user entering the area. The security application may be designed not to be arbitrarily deleted or stopped by the user, but permanently operate in a background while power of the mobile terminal is maintained in an on state.

As for the location information about the mobile terminal, the GPS information may include assisted GPS (A-GPS) information. When the location information is obtained using the GPS information, the security application of the mobile terminal may determine whether the location information corresponds to the predetermined location.

As for the location information about the mobile terminal, the ID of the wireless network apparatus may be used for the mobile terminal to determine whether the mobile terminal is located in an area, that is, whether the location information corresponds to the predetermined location, by scanning at least one wireless network apparatus located in the area and comparing the ID of the scanned wireless network apparatus to an ID list of the at least one wireless network apparatus located in the area. The wireless network apparatus may be, for example, an access point (AP), and the ID may include an SSID. For example, when an AP having an SSID of "AAA" is located in area "A" to which a security policy is to be applied, the security control server may transmit, to the security application of the mobile terminal, the ID list including the SSID of AAA of a wireless network apparatus to which the security policy is applied. Here, when the mobile terminal is located in area A and the SSID of AAA of the AP is detected by scanning the AP in area A, the security policy may be applied to the mobile terminal.

Operation 130 determines whether the mobile terminal is at the predetermined location using, for example, the location information of the mobile terminal.

In operation 140, when the mobile terminal is determined to be at the predetermined location, a predetermined security policy is applied based on the security level. The mobile terminal may store the security level received from the security control server. When the mobile terminal is determined to be at the predetermined location, a function of the mobile terminal may be restricted by applying the predetermined security policy based on the stored security level.

Also, when the mobile terminal is determined to be at the predetermined location, the security application may transmit, to the security control server, an update request for the security level, and the mobile terminal may receive the updated security level from the security control server. The security application installed in the mobile terminal may restrict a function of the mobile terminal by applying the predetermined security policy based on the updated security level.

Examples of functions of the mobile terminal include WiFi, Bluetooth, tethering, camera, microphone, external memory access control, screen capture, and the like.

The ID list of the wireless network apparatuses installed at the predetermined location may be received from the security control server. The ID list of the wireless network apparatus may be obtained prior to obtaining the location information on the mobile terminal. Also, in operation 120, the mobile terminal compares the ID of the wireless network apparatus scanned by the mobile terminal to the ID list of the wireless network apparatuses. The ID list of the wireless network apparatuses may refer to a list of IDs of wireless network apparatuses present in an area, for example, a workplace. The ID list of the wireless network apparatuses may include an ID of at least one wireless network apparatus and location information about a location at which the wireless network apparatus is located.

Figure 2:
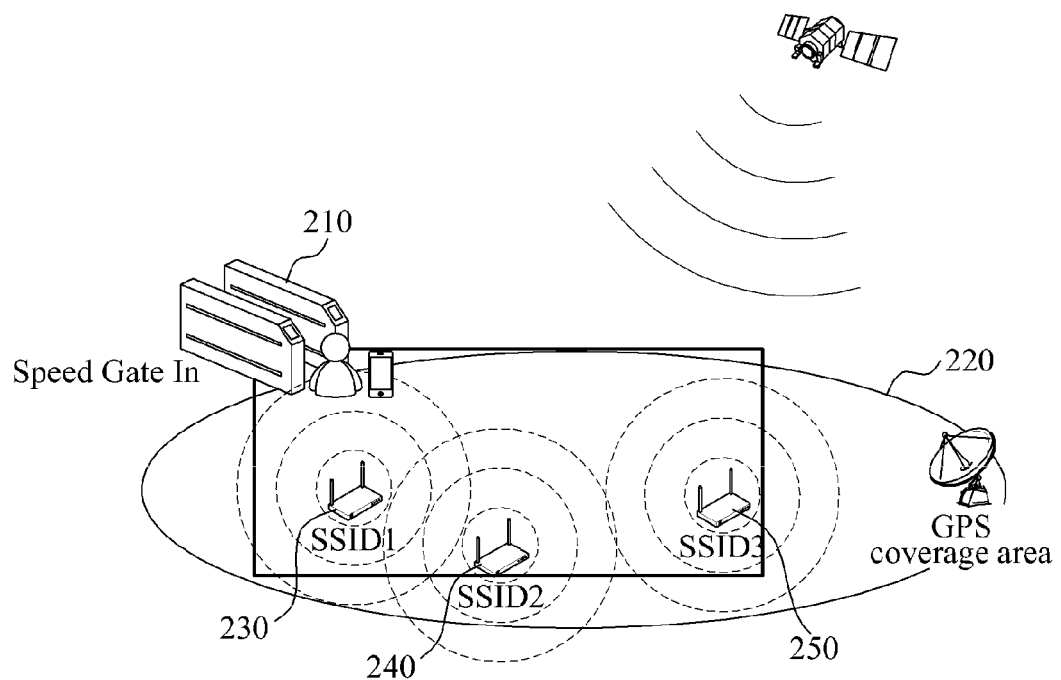
FIG. 2 is a diagram illustrating an example of obtaining location information about a mobile terminal according to an embodiment of the present invention.

FIG. 2 is a diagram illustrating an example of obtaining location information about a mobile terminal according to an embodiment of the present invention.

A location of the mobile terminal may be obtained based on gate access information. For example, an access control system may detect a user of the mobile terminal entering an access gate 210. When the user of the mobile terminal passes through the access gate 210 and enters an area, the gate access information may indicate an "entry." The location of the user of the mobile terminal may thus be defined as the entered area, for example, a workplace.

Alternatively or additionally, the location of the mobile terminal may be obtained based on GPS information. For example, when the GPS information obtained by the mobile terminal is within a predetermined location, for example, a GPS coverage area 220, the location of the user of the mobile terminal may be defined as the predetermined location, for example, a workplace.

Further, the location of the mobile terminal may also be obtained based on an ID of a wireless network apparatus scanned in the mobile terminal. For example, when the ID of the wireless network apparatus scanned in the mobile terminal matches any one of SSID 1 230, SSID 2 240, an SSID 3 250 in an ID list of wireless network apparatuses, the location of the mobile terminal may be defined as the corresponding area, for example, a workplace.

<Security Level Based on Location Information on a Mobile Terminal>

FIGS. 3 through 6 are flowcharts variously illustrating the applying of a security policy of a mobile terminal according to embodiments of the present invention. These figures illustrate examples of when the mobile terminal is determined to be present in a workplace, a security policy may be applied to the mobile terminal.

Figure 3:
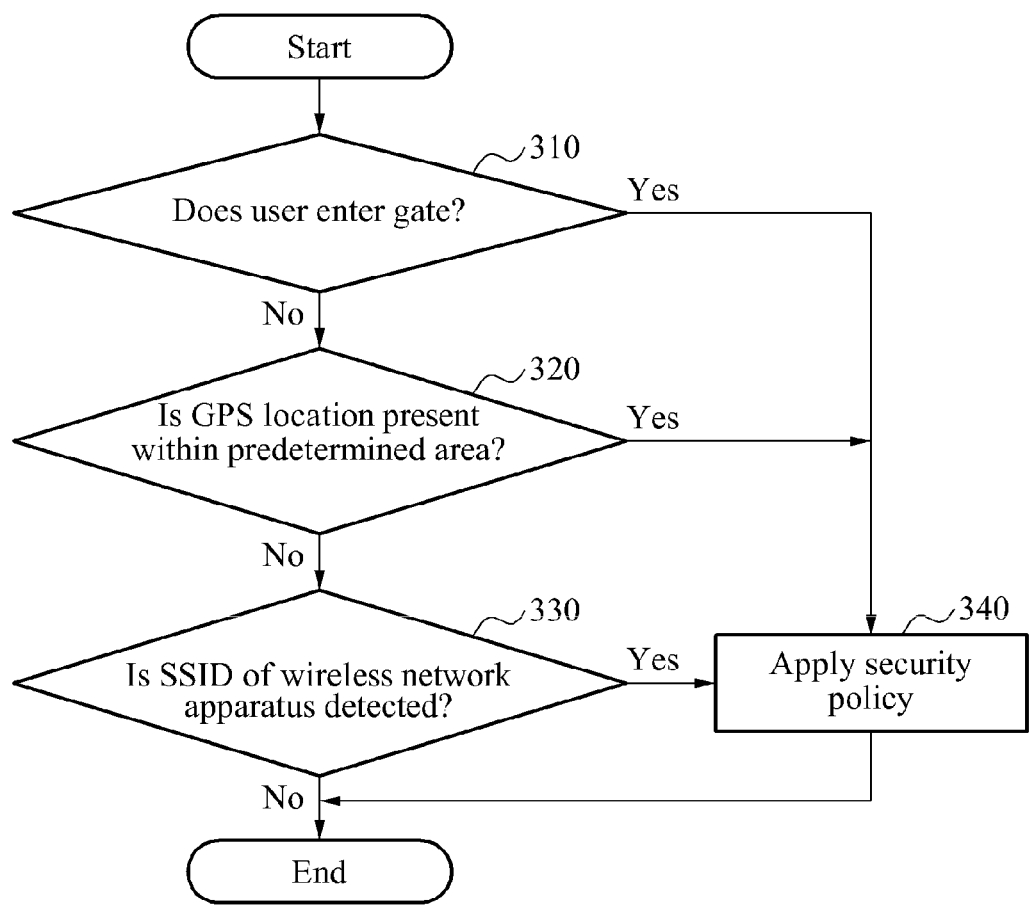
FIGS. 3 through 6 are flowcharts variously illustrating the applying of a security policy of a mobile terminal according to embodiments of the present invention.

FIG. 3 is a flowchart illustrating a security level of "high security." When the security level is high security, a predetermined security policy may be applied when a mobile terminal is determined to be at a predetermined location, for example, in a workplace, based on any one of three location determining logics used to determine a location of the mobile terminal, for example, gate access information, GPS information, or ID of a wireless network apparatus. The high security level is generally applied to an environment requiring a high level of security.

Referring to FIG. 3, in operation 310, an access control system detects whether a user of the mobile terminal enters a gate. When the user of the mobile terminal enters the gate, during a normal scenario, the gate access information may indicate an "entry" and a location of the user of the mobile terminal may be determined to be the workplace. Here, the mobile terminal does not need to obtain the GPS information or scan the ID of a wireless network apparatus. In operation 340, when the location of the mobile terminal is determined to be in the workplace, a security policy corresponding to the high security may be applied. When the security policy is applied, at least one function of the mobile terminal may be restricted.

When the user of the mobile terminal passes through the gate abnormally, for example, without an RFID card, the gate access information may indicate an "exit." In this scenario, the user may enter the workplace with the mobile terminal carried by the user, and the mobile terminal may obtain the GPS information and the ID of the wireless network apparatus by scanning connectable wireless network apparatuses. When the GPS information obtained in the mobile terminal corresponds to a predetermined GPS coverage area, for example, in the workplace, the location of the mobile terminal may be defined as that of the workplace. Also, the mobile terminal may scan a connectable wireless network apparatus to obtain an ID of the wireless network apparatus. When the obtained ID corresponds to an ID included in the ID list of wireless network apparatuses stored in a security application, the location of the mobile terminal may be defined as being in the workplace. When the location of the mobile terminal is determined to be in the workplace based on any one of the GPS information or the wireless network ID, although the user passes through the gate abnormally, a predetermined security policy may be applied to the mobile terminal.

In operation 320, when the user of the mobile terminal exits the gate normally, the mobile terminal may determine whether the GPS location is at a predetermined location. Here, the predetermined location may refer to a GPS coverage area set in a security control server. A security application installed in the mobile terminal may determine whether the mobile terminal is at the predetermined location based on the GPS information obtained in the mobile terminal. When the location of the mobile terminal is determined to be at the predetermined location, the location of the mobile terminal may be determined to be in the workplace. In operation 340, a predetermined security policy may be applied to the mobile terminal.

In operation 320, the mobile terminal scans IDs of connectable wireless network apparatuses although the GPS location of the mobile terminal is out of the predetermined location. In operation 330, the security application of the mobile terminal compares the ID of the scanned wireless network apparatus to the ID list of wireless network apparatuses received from the security control server, and determines whether the ID of the scanned wireless network apparatus is an ID of a wireless network apparatus located in the workplace. The ID list of wireless network apparatus may refer to a list of IDs of wireless network apparatuses located in the workplace.

The ID list of wireless network apparatuses may be received from the security control server. Alternatively, when the ID list of the wireless network apparatus is modified, the security control server may transmit an updated ID list to the mobile terminal.

The mobile terminal may compare the ID of the mobile terminal scanned at a current location to the ID list received from the security control server. In operation 340, when the ID of the scanned wireless network apparatus is included in the ID list of wireless network apparatuses, a predetermined security policy may be applied to the mobile terminal.

As described in the foregoing, when the security level is set to high security, the predetermined security policy may be applied to the mobile terminal when the location of the mobile terminal is determined to be in the workplace based on any one of the gate access information, the GPS information, or the ID of the scanned wireless network apparatus.

Figure 4:
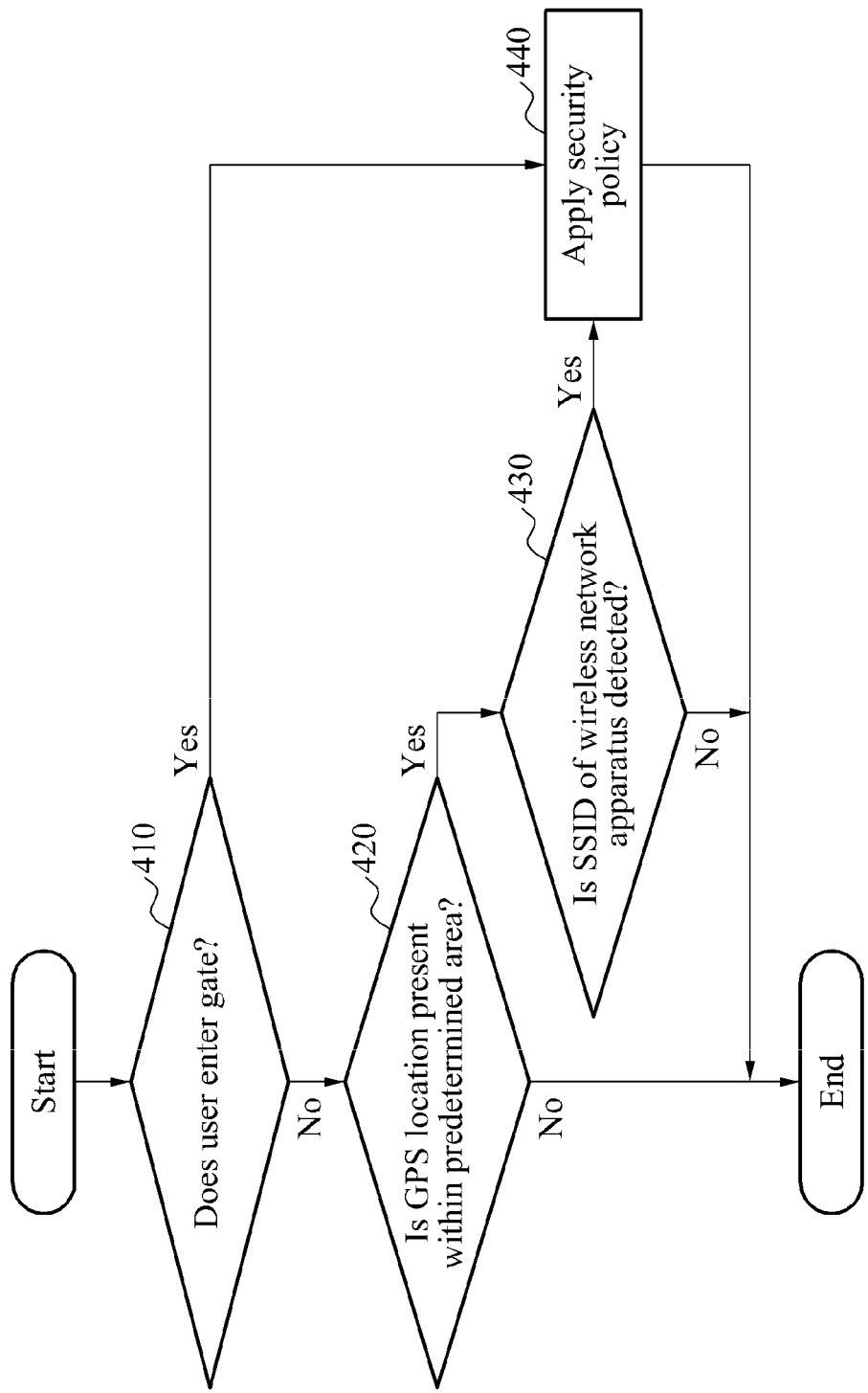

FIG. 4 is a flowchart illustrating a security level of "entry preferred." When a mobile terminal is determined to be in a workplace based on gate access information among three location determining logics, for example, the gate access information, GPS information, or an ID of a wireless network apparatus, for example, when the gate access indicates an "entry," a security policy corresponding to the entry preferred may be applied. Alternatively, when the mobile terminal is determined to be in the workplace based on two remaining logics, despite various types of abnormal entries, for example, when the gate access information indicates the "exit," a security policy corresponding to the entry preferred may be applied.

Referring to FIG. 4, in operation 410, an access control system detects whether the mobile terminal enters an access gate. When a user of the mobile terminal enters the gate normally, the gate access information may indicate an "entry," and a location of the mobile terminal may be determined to be in the workplace. Here, the mobile terminal may not obtain the GPS information or scan an ID of a wireless network apparatus. In operation 440, when the location of the mobile terminal is determined to be in the workplace, a predetermined security policy may be applied to the mobile terminal. When the security policy is applied, at least one function of the mobile terminal may be restricted.

When the user of the mobile terminal enters the gate abnormally, the gate access information may maintain the "exit." Here, the location of the mobile terminal may be determined based on the GPS information and the ID of the wireless network apparatus scanned in the mobile terminal Operation 420 determines whether the GPS information obtained in the mobile terminal is at the predetermined location, for example, a GPS coverage area. When the GPS information is determined to be at the predetermined location, the mobile terminal may scan the ID of the wireless network apparatus. Operation 430 determines whether the scanned wireless network ID corresponds to an ID list of wireless network apparatuses. When the scanned ID corresponds to the ID list, the location of the mobile terminal may be determined to be in the workplace. In operation 440, when the location of the mobile terminal is determined to be in the workplace, a predetermined security policy may be applied to the mobile terminal.

Figure 5:
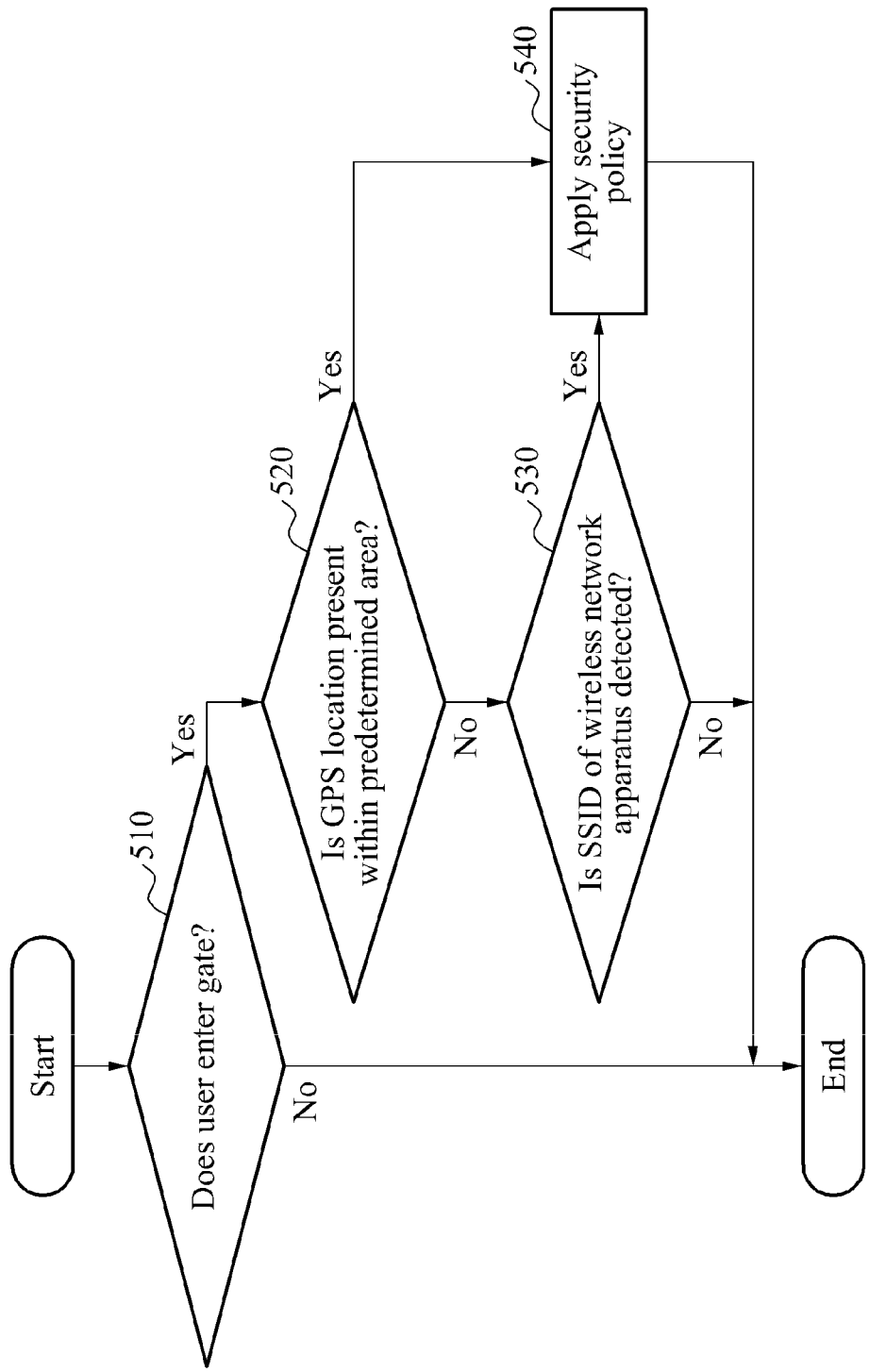

FIG. 5 is a flowchart illustrating a security level of "exit preferred." When a mobile terminal is determined not to be in a workplace based on gate access information of three location determining logics, for example, the gate access information, GPS information, and an ID of a wireless network apparatus, for example, when the gate access information indicates an "exit," a security policy may not be applied to the mobile terminal. Alternatively, when the mobile terminal is determined to be in a workplace based on the GPS information or two remaining logics, despite various types of abnormal exits, for example, although the gate access information indicates an "entry," a security policy may be applied to the mobile terminal.

Referring to FIG. 5, in operation 510, an access control system detects whether a user of the mobile terminal enters an access gate. When the user of the mobile terminal exits the gate normally, the gate access information may indicate "exit." When the gate access information is maintained as the "exit," a location of the mobile terminal may be determined to be out of the workplace, and thus, a security policy may not be applied to the mobile terminal. Here, the mobile terminal may not obtain the GPS information or scan a connectable wireless network apparatus.

When the mobile terminal exits the access gate abnormally, the gate access information may be maintained as "entry." In this scenario, the location of the mobile terminal may be determined based on the GPS information and the scanned wireless network apparatus ID. In operation 520, when the gate access information is maintained as "entry," the mobile terminal determines whether a GPS location of the mobile terminal is in a predetermined area. Here, the predetermined area may refer to a GPS coverage area set in a security control server. The mobile terminal may determine whether the mobile terminal is at the predetermined location based on the GPS information. When the location of the mobile terminal is determined to be at the predetermined location, the location of the mobile terminal may be determined to be in the workplace. In operation 540, when the location of the mobile terminal is determined to be in the workplace, a predetermined security policy may be applied to the mobile terminal.

When the GPS location of the mobile terminal is out of the predetermined area, the mobile terminal may scan for a connectable wireless network apparatus. In operation 530, the mobile terminal compares the ID of the wireless network apparatus obtained through the scanning to an ID list of wireless network apparatuses, and determines whether the scanned wireless network apparatus ID is an ID of a wireless network apparatus located in the workplace.

The ID list of wireless network apparatuses may refer to a list of IDs of wireless network apparatuses located in the workplace. In operation 540, when the ID of the wireless network apparatus is determined to be in the workplace, a security policy may be applied to the mobile terminal.

Figure 6:
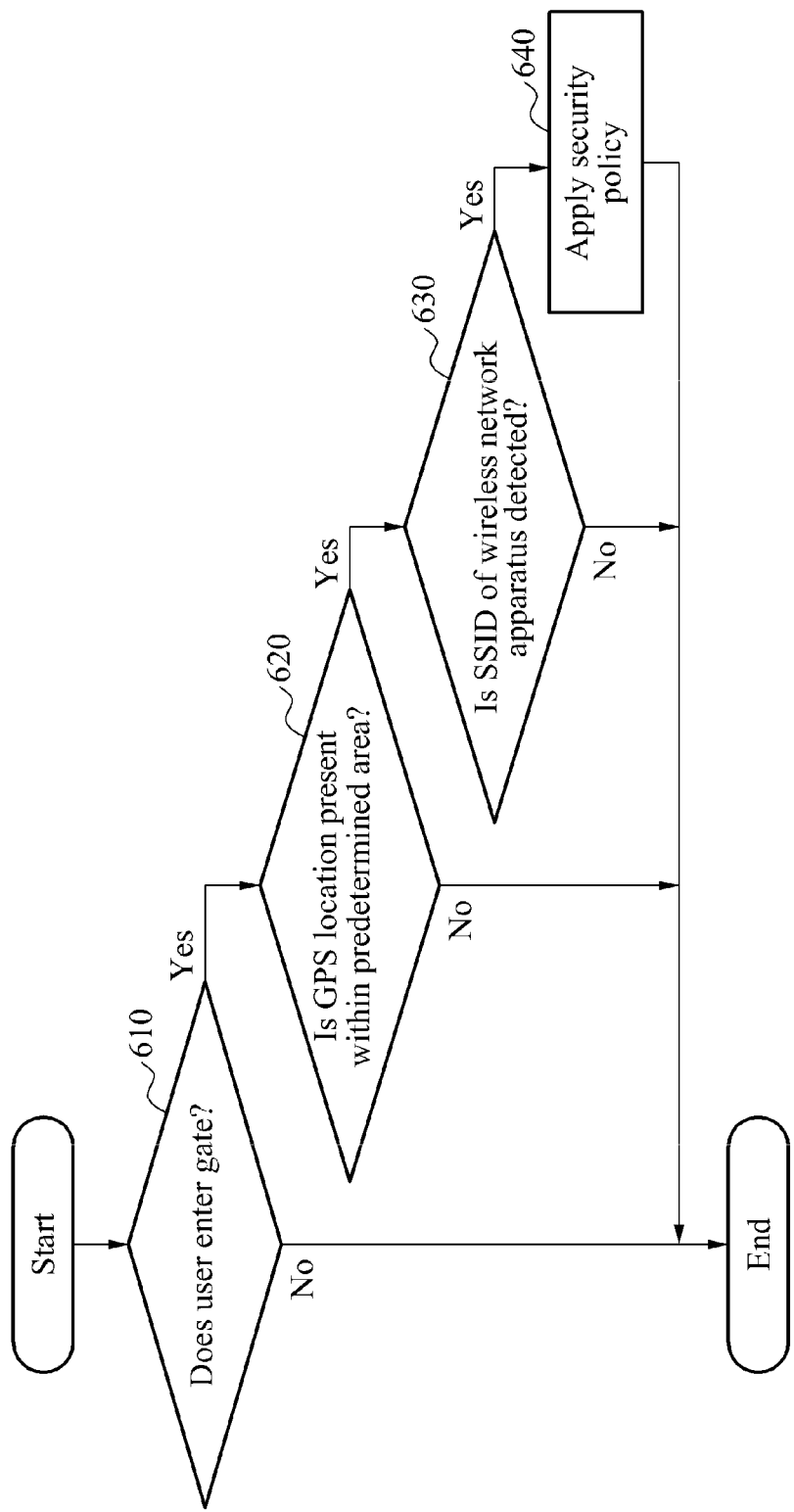

FIG. 6 is a flowchart illustrating a security level of "low security." When a mobile terminal is determined to be in a workplace based on all three location determining logics, for example, gate access information, GPS information, and an ID of a wireless network apparatus, a security policy may be applied. The low security level may be applied to an environment requiring a relatively low level of security.

Referring to FIG. 6, in operation 610, an access control system determines whether a user of the mobile terminal enters an access gate. When the user of the mobile terminal exits the gate normally, the gate access information may indicate an "exit." Here, a location of the mobile terminal may be determined to be out of the workplace and thus, a security policy may not be applied to the mobile terminal. Here, the mobile terminal may not obtain the GPS information or scan a connectable wireless network apparatus.

When the user of the mobile terminal exits the access gate abnormally or enters the access gate normally, the gate access information may indicate an "entry." In operation 620, when the gate access information indicates the entry, the mobile terminal determines whether the GPS information is in a predetermined area. Here, the predetermined area may refer to a GPS coverage area set in a security control server.

When a GPS location of the mobile terminal is in the predetermined area, the mobile terminal may scan for a connectable wireless network apparatus and obtain an ID of the wireless network apparatus. In operation 630, the mobile terminal compares the ID of the scanned wireless network apparatus to an ID list of wireless network apparatuses, and determines whether the ID of the scanned wireless network apparatus is an ID of a wireless network apparatus located in the workplace.

The ID list of wireless network apparatuses may refer to a list of IDs of wireless network apparatuses located in the workplace. In operation 640, when the ID of the scanned wireless network apparatus is determined to be the ID of the wireless network apparatus located in the workplace, a predetermined security policy may be applied to the mobile terminal.

At the low security level, the gate access information, the GPS information, and the ID of the scanned wireless network apparatus may all be used to determine whether the location of the mobile terminal is in the workplace. Here, the security policy may be applied to the mobile terminal only when the location of the mobile terminal is determined to be in the workplace.

<An Operating Method of a Security Control Server>

A security control server may include an access control system and a mobile terminal control system.

The access control system may detect a user of a mobile terminal entering or exiting a gate. The access control system may transmit, to the mobile terminal control system, gate access information of the user.

The mobile terminal control system may transmit a control command to a security application installed in the mobile terminal. The security application receiving the control command from the mobile terminal control system may manage and control the mobile terminal. The mobile terminal control system may apply system settings, security applications, rules for usage, and the like to the mobile terminal through the security application. When a threat to security of the mobile terminal is expected, the mobile terminal control system may restrict usage of the mobile terminal through the control command or prevent a security related accident by deleting data.

The mobile terminal control system may include a policy-based control unit and a location-based control unit. The policy-based control unit may control the mobile terminal based on a security policy set by an administrator. The policy-based control unit may set various security policies based on expected situations and transmit the security policies to the mobile terminal. The mobile terminal may be automatically controlled according to surrounding conditions based on the received security policies without an intervention of the user, and the security policies may be applied thereto. The location-based control unit may control the mobile terminal based on a location of the mobile terminal and apply a security policy to the mobile terminal.

Figure 7:
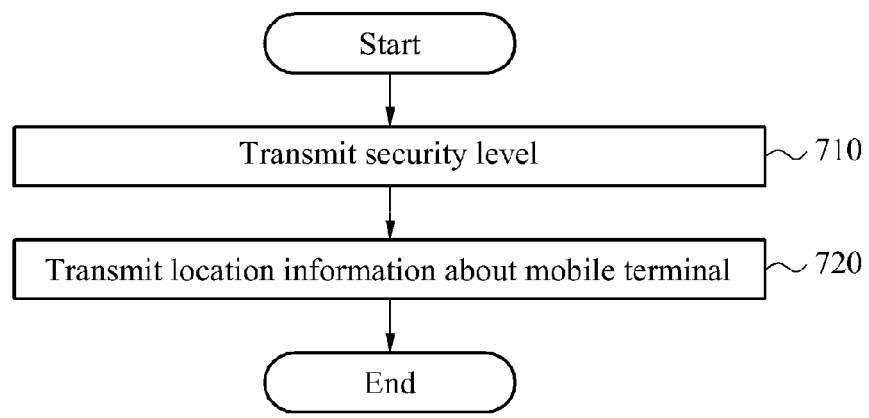
FIG. 7 is a flowchart illustrating an operating method of a security control server according to an embodiment of the present invention.

FIG. 7 is a flowchart illustrating an operating method of a security control server according to an embodiment of the present invention. In operation 710, the security control server transmits a security level of a predetermined location to a mobile terminal. The security level may be set based on one of gate access information indicating a user of the mobile terminal entering or exiting a gate, GPS information about the mobile terminal, or an ID of a wireless network apparatus scanned by the mobile terminal.

The security level may include any one of high security, entry preferred, exit preferred, or low security.

Regarding the high security level, when a location of the mobile terminal obtained based on any one of the gate access information, the GPS information, or the ID of the scanned wireless network apparatus corresponds to the predetermined location, a predetermined security policy may be applied to the mobile terminal.

Regarding entry preferred security level, when the gate access information indicates an "exit," and a location of the mobile terminal obtained based on the GPS information and the ID of the scanned wireless network apparatus corresponds to the predetermined location, a predetermined security policy may be applied to the mobile terminal. When the gate access information indicates an "entry," the security policy may be applied to the mobile terminal, irrespective of the GPS information and the ID of the scanned wireless network apparatus.

Regarding the exit preferred security level, when the gate access information indicates an "entry," and a location of the mobile terminal obtained based on any one of the GPS information or the ID of the scanned wireless network apparatus corresponds to the predetermined location, a predetermined security policy may be applied to the mobile terminal. When the gate access information indicates an "exit," the security policy may not be applied to the mobile terminal.

Regarding the low security level, when a location of the mobile terminal obtained based on the gate access information, the GPS information, and the ID of the scanned wireless network apparatus corresponds to the predetermined location, a predetermined security policy may be applied to the mobile terminal.

In operation 720, the security control sever transmits, to the mobile terminal, location information about the mobile terminal based on the security level. Here, the location information may be the gate access information indicating the user of the mobile terminal entering or exiting the gate.

The security control server may determine whether update information for the security level is present by interworking with a security application installed in the mobile terminal, and transmit the update information to the mobile terminal.

The security control server may transmit, to the mobile terminal, an ID list of wireless network apparatuses installed at the predetermined location.

Figure 8:
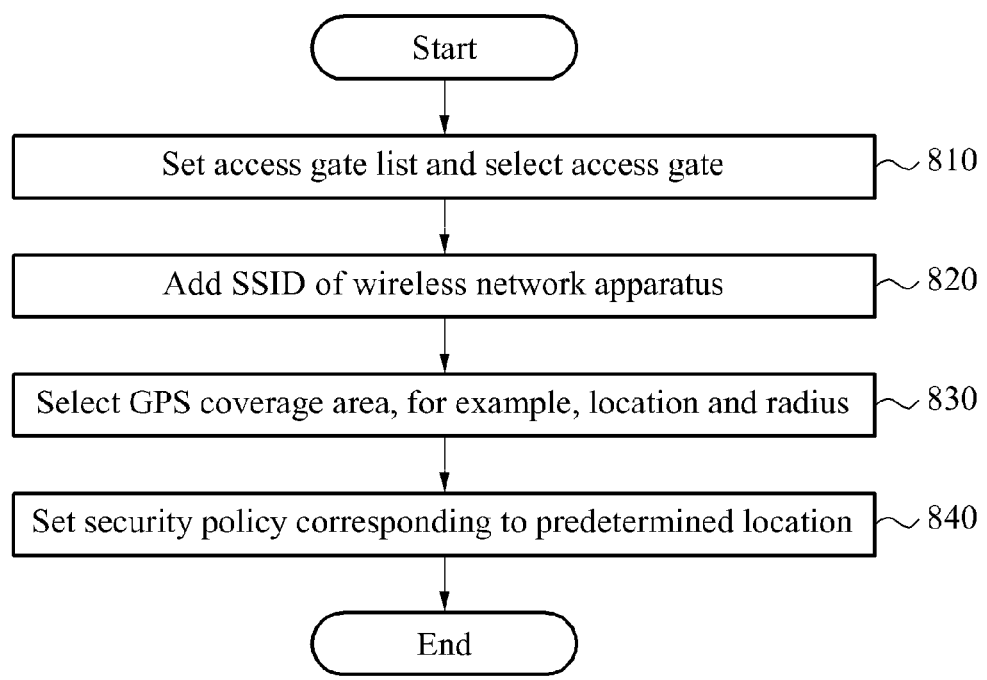
FIG. 8 is a flowchart illustrating a security level setting process of a security control server according to an embodiment of the present invention.

FIG. 8 is a flowchart illustrating a security level setting process of a security control server according to an embodiment of the present invention. In operation 810, an administrator sets an access gate list and selects an access gate to set a security level in the security control server.

In operation 820, the administrator adds an ID, for example, an SSID, of a wireless network apparatus. For example, the security control server may add SSIDs, for example, "Device on" and "LGCNS_WELCOME" through an input of the administrator. When the mobile terminal detects "Device on" or "LGCNS_WELCOME" by passing through the access gate and scanning an ID list of wireless network apparatuses, a location of the mobile terminal may be determined to be in a workplace.

In operation 830, the administrator selects a GPS coverage area. The GPS coverage area may include a radius extending several meters from a center of the workplace. When the location of the mobile terminal is within the GPS coverage area, the location of the mobile terminal may be determined to be in the workplace.

In operation 840, the administrator of the security control server sets the security level of a predetermined location.

The security level of the predetermined location may include high security, entry preferred, exit preferred, and low security.

Figure 9:
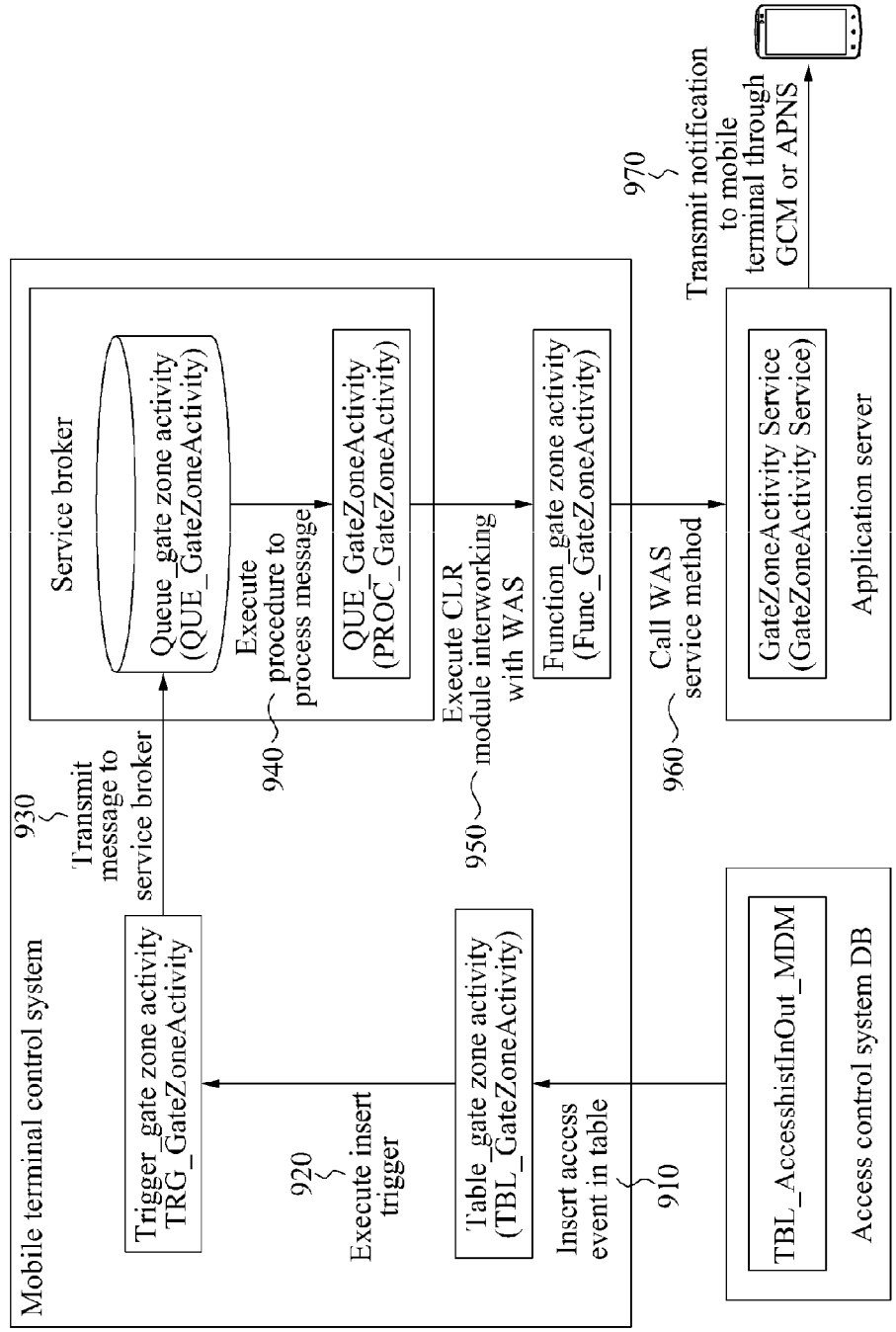
FIG. 9 is a diagram illustrating an example of interworking between an access control system and a mobile terminal control system according to an embodiment of the present invention.

FIG. 9 is a diagram illustrating an example of interworking between an access control system and a mobile terminal control system according to an embodiment of the present invention.

The access control system may manage a state of access to an area. The access control system may identify a party accessing the area through an ID card or an RFID card, trace details as to a location and time at which entry occurs, and form and manage a DB for the details.

Referring to FIG. 9, in operation 910, when the user of the mobile terminal passes through an access gate, a message queue agent inserts an access event of the access control system in a DB table of the mobile terminal control system.

In operation 920, a trigger is executed, by a unit of a line of access information inserted in the DB table.

In operation 930, the mobile terminal control system converts the access information to a form of a message and transmits the message to a service broker in the mobile terminal control system.

In operation 940, when the message enters a message queue, the service broker calls and executes a predefined procedure. When a plurality of messages are transmitted, a plurality of procedures may be executed simultaneously.

In operation 950, the executed message queue procedure reads the message from the message queue and calls a common language runtime (CLR) function defined in an application server of the mobile terminal control system.

In operation 960, the CLR function requests a representational state transfer (REST) service to be provided by the application server of the mobile terminal control system, or calls a "GateZoneActivity" method.

In operation 970, the GateZoneActivity method of the application server searches for the user and transmits a gate access notification to the mobile terminal. In the case of an Android-based mobile terminal, for example, the gate access notification may be transmitted to the mobile terminal through Google cloud messaging (GCM). In the case of an Apple iPhone Operating System (iOS)-based mobile terminal, for example, the gate access notification may be transmitted to the mobile terminal through an Apple push notification service (APNS). When the mobile terminal receives the gate access notification, a security application of the mobile terminal may be executed.

The GateZoneActivity method may update user information and be terminated.

<Configuration of a Security Control Server>

Figure 10:
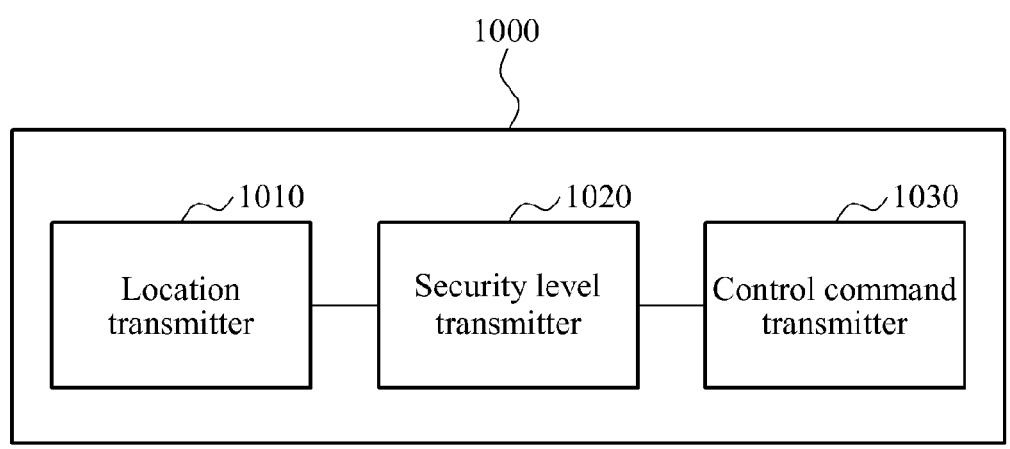
FIG. 10 is a block diagram illustrating a configuration of a security control server according to an embodiment of the present invention.

FIG. 10 is a block diagram illustrating a configuration of a security control server 1000 according to an embodiment of the present invention. In this figure the security control server 1000 includes a location transmitter 1010, a security level transmitter 1020, and a control command transmitter 1030.

Single transmitter is logically divided into the location transmitter 1010, the security level transmitter 1020, and the control command transmitter 1030. Also, each of the location transmitter 1010, the security level transmitter 1020, and the control command transmitter 1030 are separate transmitter.

When a user passes through a gate at a predetermined location, the location transmitter 1010 may transmit gate access information to a mobile terminal of the user. The gate information may be transmitted to the mobile terminal through pushing.

The security level transmitter 1020 may transmit a security level of the predetermined location to the mobile terminal. The security level may include high security, entry preferred, exit preferred, or low security. Detailed description of these security levels is provided above, and thus, repeated description will be omitted here for brevity.

The control command transmitter 1030 may determine whether update information for the security level is present by interworking with a security application installed in the mobile terminal, and transmit the update information to the mobile terminal. Also, the control command transmitter 1030 may transmit, to the mobile terminal, an ID list of wireless network apparatuses installed at the predetermined location.

The security control sever 1000 may transmit, to the mobile terminal, the ID list of the wireless network apparatuses installed at the predetermined location.

Technical descriptions provided with reference to FIGS. 1 through 9 may be similarly applied to each block illustrated in FIG. 10 and thus, a repeated description will be omitted here for brevity.

Figure 11:
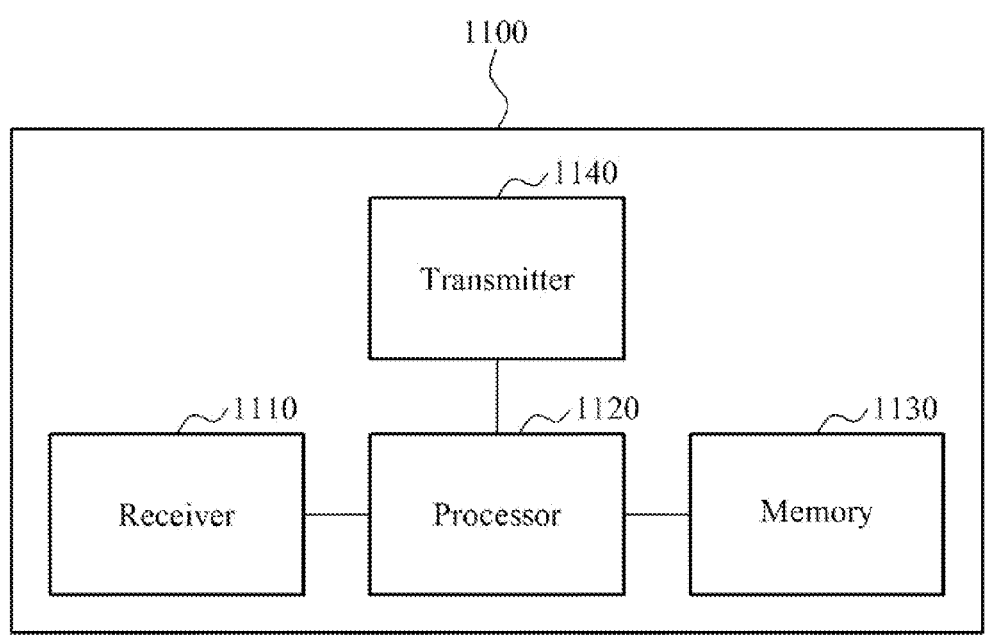
FIG. 11 is a block diagram of a mobile terminal according to an embodiment of the present invention.

FIG. 11 is a block diagram of a mobile terminal according to an embodiment of the present invention.

Referring to FIG. 11, a mobile terminal 1100 includes receiver 1110 and processor 1120.

The receiver 1110 may receive a security level of a predetermined or defined location from a security control server. The receiver 1110 may receive the security level from the security control server through a security application, for example, of a mobile terminal control system client installed in a memory 1130. The security level may be newly received from the security control server every time the location information about the mobile terminal 1100 is determined to correspond to the predetermined location. Alternatively, the security level may be information received from the security control server in advance and stored in the memory 1130. When the security level is updated, the security control server may transmit a new security level to the mobile terminal 1100 and allow the security level stored in the memory 1130 to be updated. The security level may further include version information or information about a date at which most recent update is achieved, and thus, a most recently updated security level may be reflected and implemented.

The processor 1120 may obtain the location information about the mobile terminal 1100 include the gate access information indicating the user of the mobile terminal 1100 is entering or exiting the gate, the GPS information about the mobile terminal, and the ID, for example, a service set ID (SSID), of the wireless network apparatus scanned by the mobile terminal 1100.

The processor 1120 may determine whether the mobile terminal 1100 is at the predetermined location using, for example, the location information of the mobile terminal 1100.

When the mobile terminal is determined to be at the predetermined location, a predetermined security policy is applied based on the security level. The memory 1130 may store the security level received from the security control server. When the mobile terminal 1100 is determined to be at the predetermined location, the processor 1120 may restrict a function of the mobile terminal 1100 by applying the predetermined security policy based on the stored security level. Also, when the mobile terminal 1100 is determined to be at the predetermined location, a transmitter 1140 may transmit, to the security control server, an update request for the security level, and the receiver 1110 may receive the updated security level from the security control server.

Examples of functions of the mobile terminal 1100 include WiFi, Bluetooth, tethering, camera, microphone, external memory access control, screen capture, and the like.

The receiver 1110 may receive an ID list of the wireless network apparatuses installed at the predetermined location from the security control server. The ID list of the wireless network apparatus may be obtained prior to obtaining the location information on the mobile terminal 1100. Also, the processor 1120 may compare the ID of the wireless network apparatus scanned by the mobile terminal 1100 to the ID list of the wireless network apparatuses. The ID list of the wireless network apparatuses may refer to a list of IDs of wireless network apparatuses present in an area, for example, a workplace. The ID list of the wireless network apparatuses may include an ID of at least one wireless network apparatus and location information about a location at which the wireless network apparatus is located.

Figure 12:
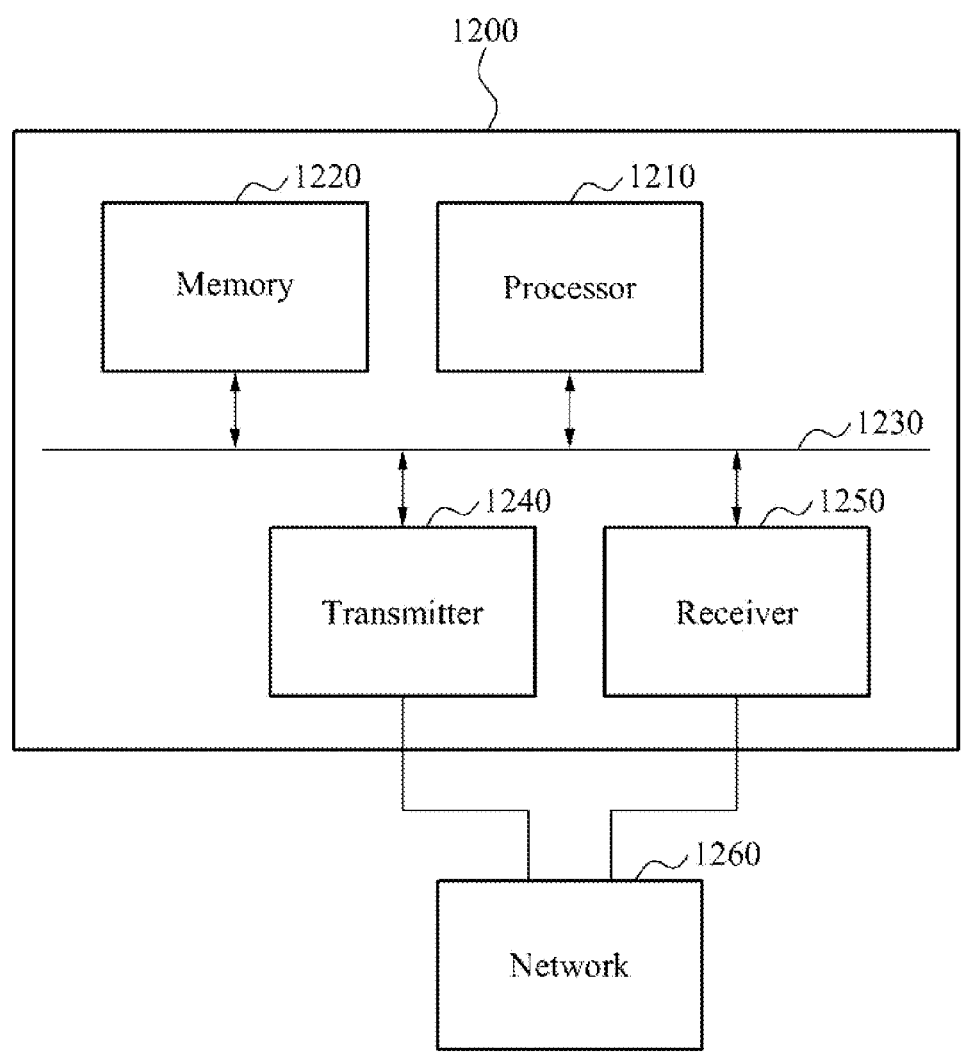
FIG. 12 is a block diagram of a server according to an embodiment of the present invention.

FIG. 12 is a block diagram of a server according to an embodiment of the present invention. Referring to FIG. 12, a server 1200 may include, but are not limited to, one or more processors 1210, a memory 1220, and a bus 1230 that couples various system components including memory 1220 to processor 1210.

Bus 1230 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Server 1200 may communicate with one or more networks 1260 such as a local area network (LAN), a general wide area network (WAN), and/or a public network (e.g., the Internet) via transmitter 1240 and receiver 1250.

For example, transmitter 1240 may transmit gate access information to a mobile terminal of the user. Also, transmitter 1240 may transmit a security level of the predetermined location to the mobile terminal and determine whether update information for the security level is present by interworking with a security application installed in the mobile terminal, and transmit the update information to the mobile terminal Transmitter 1230 may include a location transmitter 1010, security level transmitter 1020, and control command transmitter 1030 depicted in FIG. 10.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for controlling a mobile terminal, the method comprising:
receiving, at the mobile terminal, a plurality of security levels of a defined location, wherein each of the security levels is set based on at least one source among a plurality of sources comprising gate access information, global positioning system (GPS) information of the mobile terminal, or an identifier (ID) of a wireless network apparatus;
obtaining location information of a current location of the mobile terminal, after the receiving of the plurality of security levels, from one or more of the sources;
identifying the current location of the mobile terminal based on the obtained location information from the one or more sources; and setting a first security level when the location information is obtained using any one of the gate access information, the GPS information, or the ID, and when the location information corresponds to the defined location;

setting a second security level when the gate access information indicates an entry, or when the location information obtained using the GPS information and the ID corresponds to the defined location, setting a third security level when the gate access information indicates an entry, and when the location information obtained using at least one of the GPS information or the ID corresponds to the defined location, and setting a fourth security level when the location information obtained of all of the gate access information, the GPS information, and the ID, corresponds to the defined location, applying a security policy to the mobile terminal based on a set security level, among the first, second, third, and fourth security levels.

2. The method of claim 1, wherein the first to fourth security levels respectively comprise one of high security, entry preferred, exit preferred, or low security.

3. The method of claim 2,
wherein the first security level is the high security,
wherein the second security level is the entry preferred,
wherein the third security level is the exit preferred, and
wherein the fourth security level is the low security.

4. The method of claim 1, further comprising:
receiving an ID list of wireless network apparatuses present at the defined location from a security control server,
wherein the obtaining of the location information of the mobile terminal comprises:
comparing the ID of the wireless network apparatus scanned by the mobile terminal to IDs of the ID list.

5. The method of claim 1, wherein the gate access information is obtained from a security control server when the user of the mobile terminal enters or exits the gate.

6. An operating method for a security control server, the method comprising:
transmitting, to a mobile terminal, a plurality of security levels of a defined location, wherein the plurality of security levels comprise first to fourth security levels,
wherein the first security level is defined as when location information of the mobile terminal is obtained using any one of gate access information, global positioning system (GPS) information, or an identifier (ID) of a wireless network apparatus, and when the location information corresponds to the defined location;
wherein the second security level is defined as when the gate access information indicates an entry, or when the location information obtained using the GPS information and the ID corresponds to the defined location,
wherein the third security level is defined as when the gate access information indicates an entry, and when the location information obtained using at least one of the GPS information or the ID corresponds to the defined location, and
wherein the fourth security level is defined as when the location information obtained of all of the gate access information, the GPS information, and the ID, corresponds to the defined location; and
transmitting, to the mobile terminal, gate access information of the mobile terminal, indicating the mobile terminal is entering or exiting the gate to permit the mobile terminal to set any of the first to fourth security levels based on the gate access location information.

7. The method of claim 6, further comprising:
determining whether update information for the plurality of security levels is present by interworking with a security application installed in the mobile terminal; and
transmitting the update information to the mobile terminal.

8. The method of claim 6, wherein the first to fourth security levels respectively comprise one of high security, entry preferred, exit preferred, or low security, and at least one function of the mobile terminal is restricted based on a security policy corresponding to the security levels.

9. The method of claim 8,
wherein the first security level is the high security,
wherein the second security level is the entry preferred,
wherein the third security level is the exit preferred, and
wherein the fourth security level is the low security.

10. The method of claim 6, further comprising:
transmitting, to the mobile terminal, an ID list of wireless network apparatuses present at the defined location.

11. A security control server, comprising:
a location transmitter configured to transmit gate access information to a mobile terminal of a user when the user passes through a gate at a defined location;
a security level transmitter configured to transmit a plurality of security levels of the defined location to the mobile terminal, wherein the gate access information is different than the security levels; and
a control command transmitter configured to verify whether update information for the security level is present by interworking with a security application operating at the mobile terminal and transmit the update information to the mobile terminal,
wherein the plurality of security levels comprise first to fourth security levels,
wherein the first security level is defined as when location information of the mobile terminal is obtained using any one of gate access information, global positioning system (GPS) information, or an identifier (ID) of a wireless network apparatus, and when the location information corresponds to the defined location;
wherein the second security level is defined as when the gate access information indicates an entry, or when the location information obtained using the GPS information and the ID corresponds to the defined location,
wherein the third security level is defined as when the gate access information indicates an entry, and when the location information obtained using at least one of the GPS information or the ID corresponds to the defined location, and
wherein the fourth security level is defined as when the location information obtained of all of the gate access information, the GPS information, and the ID, corresponds to the defined location.

12. The security control server of claim 11, wherein the first to fourth security levels respectively comprise one of high security, entry preferred, exit preferred, or low security, and at least one function of the mobile terminal is restricted based on a security policy corresponding to the security levels.

13. The security control server of claim 12,
wherein the first security level is the high security,
wherein the second security level is the entry preferred,
wherein the third security level is the exit preferred, and
wherein the fourth security level is the low security.

14. The security control server of claim 11, wherein the control command transmitter transmits, to the mobile terminal, an ID list of wireless network apparatuses located at the defined location.

15. The security control server of claim 11, wherein the gate access information is transmitted to the mobile terminal through pushing.

16. A method for controlling a mobile terminal, the method comprising:
- receiving, at the mobile terminal, a plurality of different security levels of a defined location, wherein each of the security levels is set based on a different combination of at least one source among a plurality of sources comprising gate access information, global positioning system (GPS) information of the mobile terminal, or an identifier (ID) of a wireless network apparatus;
- obtaining location information of a current location of the mobile terminal, after the receiving of the plurality of security levels, from one or more of the sources;
- identifying the current location of the mobile terminal based on the obtained location information from the one or more sources; and
- setting any of the plurality of different security levels when the location information corresponds to the defined location and is obtained using respective different combinations of one or more of the gate access information, the GPS information, or the ID.

* * * * *